Patented May 10, 1932

1,857,219

UNITED STATES PATENT OFFICE

COLIN JAMES SMITHELLS, OF BUSHEY, ENGLAND, ASSIGNOR TO GENERAL ELECTRIC COMPANY, A CORPORATION OF NEW YORK

MANUFACTURE OF REFRACTORY METAL BODIES

No Drawing. Application filed April 10, 1931, Serial No. 529,291, and in Great Britain May 10, 1930.

The present invention relates to the manufacture of refractory metal bodies, such as tungsten.

In the manufacture of such metals by the usual process a bar of the compressed powdered metal is sintered at one stage by heating it to a temperature not far below the melting point in an atmosphere of an inert gas or of hydrogen. I have found that the properties of the resulting metal can be improved if this sintering is replaced or followed by sintering in an atmosphere of an inert gas, such as argon, mixed with the vapor of a highly electropositive metal, such as sodium or the like. In particular, wire made from metal sintered in such an atmosphere is less liable to sag when it is used as the filament of an electric incandescent lamp. This improvement probably results from the removal of minute traces of oxides and similar compounds present in the bar before sintering; these are reduced by the sodium vapor and form compounds with the sodium that are volatile at the temperature of the bar, and therefore escape from it.

According to the present invention, a refractory metal such as tungsten, is heated, during its manufacture, to a temperature not far removed from its melting point in an atmosphere containing the vapor of a metal other than that which is being sintered and other than mercury.

In order to reduce the time during which the metal has to be sintered in the presence of the metallic vapor, it is preferable to precede this sintering with a sintering in hydrogen according to the usual practice.

Several methods may be used for introducing into the atmosphere the necessary proportion of metallic vapor. Thus a small portion of the metal which provides the vapor may be placed in a boat near the heated bar of refractory metal, so that it boils or evaporates during the sintering. Alternatively a stream of a neutral gas may be passed through the sintering chamber over the molten metal with the vapor or spray of which it is to be mixed.

The following is an example of the manufacture of tungsten according to the invention. A tungsten bar is prepared from powder and sintered in hydrogen at a temperature slightly below the melting point for about 25 minutes in accordance with the usual practice. A boat containing a few grams of sodium is placed at a distance of about 1 cm. from the bar in the sintering chamber; the chamber is then filled with argon and an electric current, amounting to about 90% of the current required to melt the bar, is passed through it for a period of about 2 to 5 minutes. During this process the sodium boils vigorously. The bar is then allowed to cool, removed from the sintering chamber, and subjected in the usual manner to the processes normally used subsequent to sintering.

What I claim as new and desire to secure by Letters Patent of the United States is:

1. The process of manufacturing a body of tungsten which comprises sintering the tungsten at a temperature slightly below its melting point in an atmosphere containing sodium vapor.

2. The process of manufacturing a body of tungsten which comprises sintering the tungsten at a temperature slightly below its melting point in an atmosphere consisting mainly of argon but containing an appreciable quantity of sodium vapor.

3. The process of manufacturing a tungsten body which comprises sintering a pressed bar of tungsten at a temperature slightly below its melting point and in an atmosphere of hydrogen for about 25 minutes, then sintering the bar in an atmosphere consisting mainly of argon but containing an appreciable amount of sodium vapor.

In witness whereof, I have hereunto set my hand.

COLIN JAMES SMITHELLS.